358-86. OR 3,105,873 SR
SEARCH ROOM

Oct. 1, 1963 E. WINSTON ETAL 3,105,873

SIGNAL DISTRIBUTION SYSTEM

Filed Nov. 5, 1959 5 Sheets-Sheet 1

T500. Rm

INVENTORS
ERIC WINSTON
LEONARD D. ECKER
ROBERT N. VENDELAND
BY Max R. Millman
ATTORNEY Oct. 1, 1963 E. WINSTON ETAL 3,105,873
SIGNAL DISTRIBUTION SYSTEM
Filed Nov. 5, 1959 5 Sheets-Sheet 2

INVENTORS
ERIC WINSTON
LEONARD D. ECKER
ROBERT N. VENDELAND
BY Max R. Millman
ATTORNEY INVENTORS
ERIC WINSTON
LEONARD D. ECKER
ROBERT N. VENDELAND
BY Max R. Millman
ATTORNEY INVENTORS
ERIC WINSTON
LEONARD D. ECKER
ROBERT N. VENDELAND
BY Max R. Millman
ATTORNEY INVENTORS
ERIC WINSTON
LEONARD D. ECKER
ROBERT N. VENDELAND
BY Max R. Millman
ATTORNEY United States Patent Office 3,105,873

Patented Oct. 1, 1963

3,105,873
SIGNAL DISTRIBUTION SYSTEM

Eric Winston, Philadelphia, and Leonard D. Ecker, Willow Grove, Pa., and Robert N. Vendeland, Riverton, N.J., assignors to Jerrold Electronics Corporation, Philadelphia, Pa., a corporation of Delaware Filed Nov. 5, 1959, Ser. No. 851,158
2 Claims. (Cl. 178—6)

This invention relates to a coaxial signal distribution system, such as a closed circuit television system for installation in schools, universities, hospitals, institutions or even an entire community in which the high radio frequencies of broadcast television as well as the lower frequencies of video, audio and camera-control signals are transmitted.

Heretofore, a coaxial transmission line system was such that its function had to be clearly defined and determined before installation. At each location, a receptacle was installed in the wall which was connected to the coaxial cable and which included circuitry specifically defining its function, i.e., reception or transmission or control or combinations thereof. The receptacle with its associated circuitry was a permanent part of the line. If one desired to alter the function at a particular location, it was necessary to physically remove the entire receptacle and associated circuitry, with concomitant destruction of the wall, and to replace the same with another receptacle including different circuitry supplying a different function.

The primary object of this invention is to provide a coaxial transmission line system which is flexible and variable to meet any future needs because it obviates the necessity of predetermining functions at particular locations.

Another object of the invention is to provide a coaxial transmisison system in which the cable is installed in the wall in such a way that, at desired locations, the cable is broken and the disconnected ends are retained in receptacles readily accessible on the outside of the wall to one of a variety of interchangeable quick disconnect or plug-in units, each unit containing circuitry necessary to carry out a desired function, and externally effecting electrical connection between the ends of the cable while maintaining constant impedance in the line. The plug-in units may include circuitry providing for the insertion or tap-off of signals or isolation of one cable end from another for the entire frequency spectrum or any portion thereof. At locations where signal insertion, tap-off or isolation units are not employed, plug-in feed-through units are used which merely provide for cable continuity, any one of which feed-through units may be readily removed and replaced with any one of the aforementioned units to obtain a desired function at said location. Thus the system is flexible and universal.

Another object of the invention is to provide interchangeable quick-disconnect units capable of modifying a coaxial cable transmission line.

Yet another object of the invention is to provide a coaxial closed circuit television system which is not only flexible, variable and universal, but which can simultaneously handle a number of programs without interference and can transmit signals in any direction as required in contradistinction to the aforementioned fixed system which tends to be unidirectional.

These and other objects of the invention will become more apparent as the following description proceeds in conjunction with the accompanying drawing, wherein:

FIGURE 4 is an equivalent circuit diagram of a combined insertion and tap-off plug-in unit embodying this invention in which there is full feed through;

FIGURE 5 is an equivalent circuit diagram of another combined tap-off and insertion plug-in unit embodying this invention in which there is no feed through;

Figure 1:
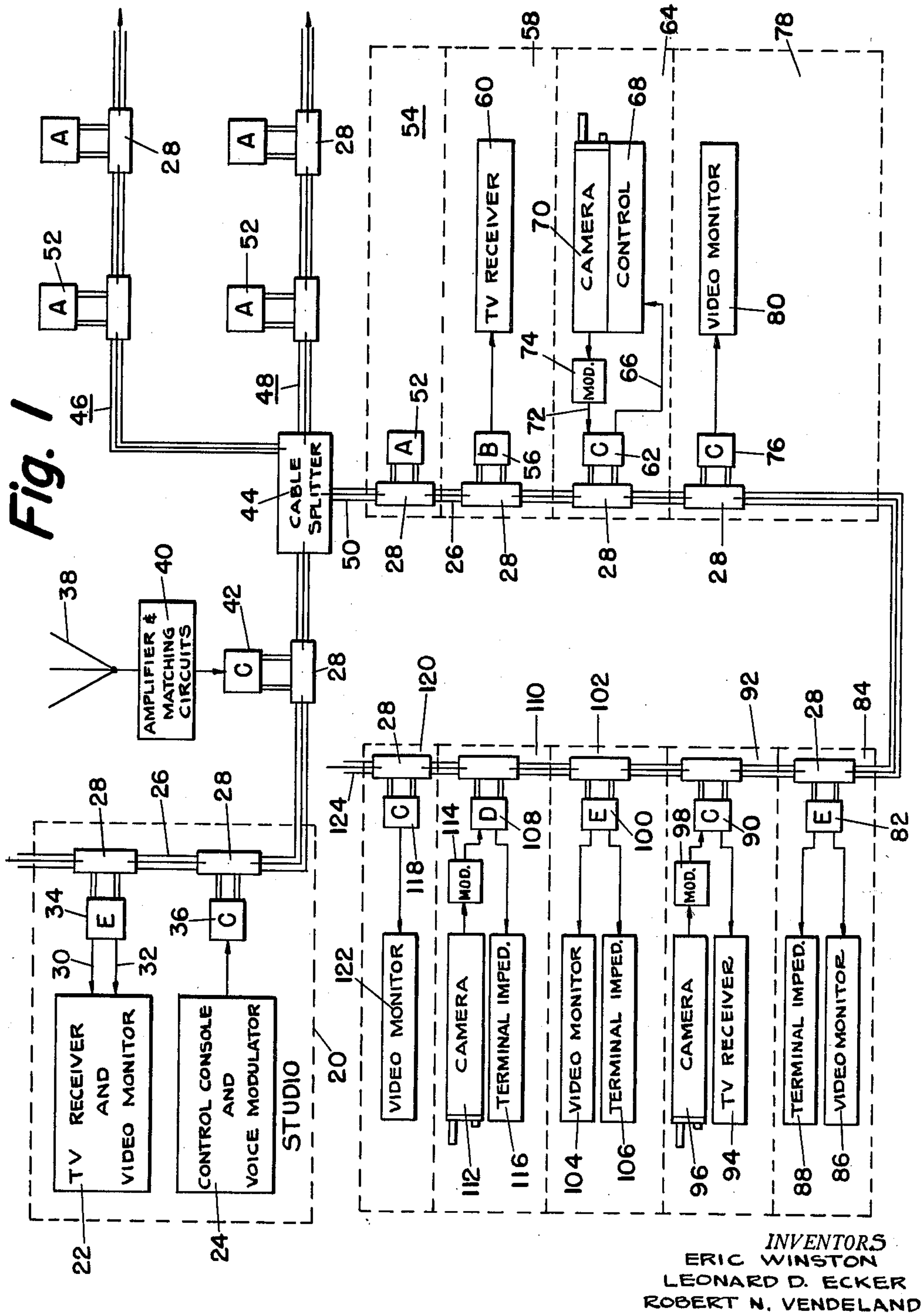
FIGURE 1 is a block diagram of a coaxial closed circuit transmission line system embodying this invention.

Before proceeding with a description of the physical and electrical characteristics of the feed-through, tap-off, insertion and isolation units and receptacles non-conductively joining the cable ends and receiving said units, it would be well to refer to them in general terms and describe their application in an overall coaxial closed circuit television system as illustrated in FIGURE 1.

Indicated at 20 is a main control room or studio which may contain a combined television receiver and video monitor 22 and a control console 24 that supplies camera control signals and provides for voice communication, the console containing modulators. The receiver and control console are connected to other parts of the system via coaxial cable 26, the ends of individual lengths of which being separated and retained as such in receptacles 28. The receiver 22 is connected via two conductors 30 and 32 to a unit 34 which plugs into the receptacle 28 and effects electrical connection between the ends of the cable in said receptacle. Similarly, the control console 24 is connected to a unit 36 which plugs into a second receptacle 28 and effects electrical connection between the ends of the cable in said receptacle.

An antenna 38 for receiving broadcast radio and television signals is connected through suitable amplifier and matching circuits 40 to a unit 42 which plugs into another receptacle 28 and effects electrical connection between the ends of cable sections retained therein, one of said cable sections coming from the studio, the other of said cable sections going to a conventional cable splitter 44 which splits it into three parallel sections 46, 48 and 50, that may represent different floors or wings of a building or even different buildings.

The cable section 50 consists of a series of individual lengths of cable 26, the ends of which are separated and retained as such in receptacles 28 located in different rooms. One of a number of interchangeable units may be plugged into each receptacle to effect cable continuity in the receptacle and to obtain a desired function. Thus, the unit 52 which is plugged into the receptacle located in room 54 is a feed-through device which merely provides for cable continuity. It contains no external connectors.

The unit 56 which is plugged into the receptacle in the next room 58 is provided with a single external lead for connection to a television receiver 60. The unit 62 which is plugged into the receptacle in the next room 64 has two external leads, one for connection as at 66 to the control circuitry 68 for camera 70, the other for connection as at 72 to a modulator 74 through which the output signals of the camera are directed. The modulator may be for the audio signals of the closed circuit transmission; the video signals may be assumed to be transmitted without a carrier (though subchannel carrier frequencies may also be provided for this purpose).

The unit 76 which is plugged into the receptacle in the next room 78 has a single external lead for connection to a video monitor 80. The unit 82 which is plugged into the receptacle in room 84 has two external leads, one for connection to a video monitor 86 and the other for connection to a terminal impedance circuit 88. The unit 90 which is plugged into the receptacle in room 92 also has two external leads, one for connection to a television receiver 94, the other for connection to camera 96 via a modulator 98. The unit 100 which is plugged into the receptacle in room 102 also has two external leads, one for connection to a video monitor 104 and the other for connection to a terminal impedance circuit 106. The unit 108 which is plugged into the receptacle in the next room 110 also has two external leads, one for connection to a camera 112 via a modulator 114 and the other for connection to a terminal impedance circuit 116.

Finally, the unit 118 which is plugged into the receptacle in the room 120 has a single external lead for connection to a video monitor 122. This section of the cable is terminated by a portion of cable 124 of suitable length or by other methods using the plug-in units as will appear hereinafter.

In operation, broadcast signals received by way of the antenna 38 and circuitry 40 may be amplified and supplied to the different cable branches, the system being arranged so that the TV receiver 22 in the studio 20 and the TV receivers 60 and 94 in rooms 58 and 92 receive the broadcast signals. The receiver and video monitor 22 may be arranged so that, by suitable switch control, either closed circuit video or the broadcast TV signals may be displayed on the television screen of that unit 22. Suitable circuitry for performing this operation is known in the art and forms no part of this invention.

The camera 70 in room 64 may be remotely controlled from the studio 20 by way of the control console 24. The modulator control signals are transmitted on a carrier wave through the cable to the room simultaneously with the transmission of the broadcast TV signals. Also, at the same time, the modulated-carrier audio signals and the video signals themselves from the camera are transmitted from the room through the cable to the video monitor 22 in the studio 20 and to the video monitors 80 and 86 in rooms 78 and 84, respectively.

A second closed circuit television program originating in room 92 may be transmitted to room 102 containing video monitor 104 (and to monitors in other intervening rooms, not shown) without interference with the closed circuit program in the rooms 64, 78 and 84. A third program may be provided in rooms 110 and 120 which does not interfere with the others on the same cable section. To expand the system as desired, a suitable unit may be plugged into a receptacle and connected to an amplifier which, in turn, may drive a further length of cable (not shown).

The system described can be varied to suit any program needs in the future because at any desired location, the feed-through units A may be replaced by the other plug-in units B to E which contain circuitry adapted to perform desired functions. Each of the receptacles 28, later to be described in detail, contains two spaced terminals respectively connected to the separated ends of the cable retained in the receptacle, said receptacle terminals being accessible to the plug-in units on the outside of the wall of any room at particular locations where the receptacle is installed. Since the cable is coaxial and contains a central signal conductor and an outer shield separated therefrom by a dielectric, each receptacle terminal includes an inner portion contacting the central conductor of the coaxial cable and an outer portion contacting the shield. The plug-in units therefore also contain two connectors to removably engage the receptacle terminals and thereby make contact with the central signal conductor and shield of the coaxial cables held in the receptacle.

The plug-in units contain circuitry designed to perform particular functions, i.e., feed-through, signal insertion or tap-off, isolation, etc. The equivalent circuitry for the units A to E of FIGURE 1 are shown respectively in FIGURES 2–6.

Figure 2:
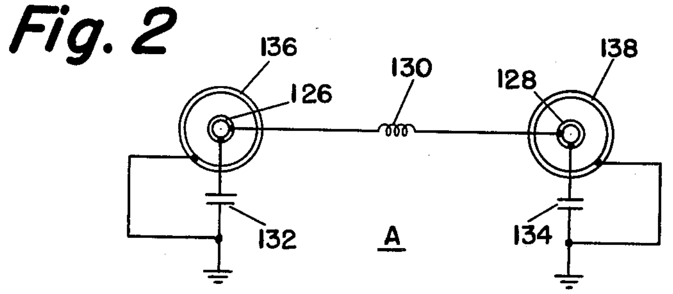
FIGURE 2 is an equivalent circuit diagram of a feed-through unit embodying this invention.

Coming first to FIGURE 2 which relates to the feed-through plug-in unit A, the central connectors 126 and 128 which, via the inner portions of the receptacle terminals make electrical contact with the central signal conductors of the separated coaxial cables, are themselves connected by a conductor shown as an inductor 130 and capacitors 132 and 134. The outer connectors 136 and 138 of the plug-in unit make electrical contact with the shields of the cable sections held in the receptacle via the terminals of the latter. These shield connectors 136 and 138 of the plug-in unit go to ground. The inductance-capacitance network 130, 132 and 134 compensates for the mismatch between the cable and the terminals, parameters being so chosen that the feed-through unit simulates the characteristics of the cable itself by maintaining constant impedance in the line.

The matching provided by the circuit such as that of FIGURE 2, is most important in order to get efficient signal transfer along the transmission line and also to avoid the reflections that are a necessary result of any mismatch. To appreciate the high quality of cable continuation that may be provided by this invention, it is of interest to compare the standing-wave ratio of conventional television systems with that afforded by this system. In ordinary broadcast television distribution systems, a standing-wave ratio of 1.25 is acceptable. Such a ratio would not be tolerable in high quality closed circuit television which requires faithful reproduction at the terminals of the signal received at the source. With this invention, a standing-wave ratio of 1.1 may be met which is adequate to meet this quality. To maintain the system specifications of an overall 1.1 standing-wave ratio, the individual components should ensure a standing-wave ratio of 1.05. Such specifications ensure fine picture quality and can be met by the system and devices of this invention.

Figure 3:
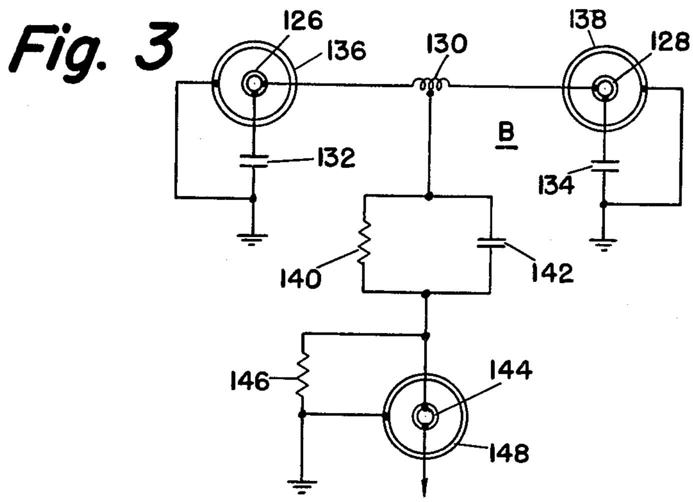
FIGURE 3 is an equivalent circuit diagram of a tap-off plug-in unit embodying this invention.

FIGURE 3 illustrates equivalent circuitry for a tap-off plug-in-unit used for tapping off radio frequencies from the cable. The feed-through circuit of FIGURE 2 is included in the tap-off circuit of FIGURE 3. In addition, the latter includes a resistor-capacitor 140, 142 parallel combination connected between a center tap on the inductor 130 and the signal contact 144 of an output terminal connector. A terminating resistor 146 is connected between the signal contact 144 and ground to which the shield 148 of the output terminal connector is returned.

The resistor-capacitor network 140, 142 affords a tap-off of about 3 to 10% of the signal being transmitted by the feed-through inductor 130. The network is designed to provide compensation for signal losses as the signal is transmitted through the cable, these losses being a function of the frequency of the signal transmitted. As is well known, the signal loss along the coaxial cable line is approximately a square root function of frequency, and increases therewith. To correct for the greater loss at higher frequencies, the capacitor 142 is designed to pass a higher percentage of the higher frequencies than of the lower frequencies. Thereby, the difference in losses may be compensated to tap off about the same percentage of the original signals of different frequencies. In practice, it has been found desirable in a 400 foot transmission line system, to provide four different designs of the compensating tap-off network 140, 142. In the first 100 feet from the signal source, a single resistor 140 may be used, for example, for a 75 ohm coaxial cable, a 750 ohm tapping resistor ensures 10% of signal tap off. The capacitance across the terminals of such a resistor affords sufficient compensating capacitance so that the capacitor 142 may be dispensed with. With such a single resistor it is found that a transmission of two db more of a VHF channel 13 signal is made than of a channel 2 signal.

For the second 100 feet of cable, it has been found suitable to provide a 5 db tilt in favor of channel 13; for a third 100 feet, an 8 db tilt in favor of channel 13; in both such cases a resistor-capacitor network 140, 142 is employed. For the fourth 100 feet an 11 db tilt in favor of channel 13 may be provided by a capacitor alone with the resistor 140 being dispensed with. Thereby, variations in signal loss with frequency may be compensated.

The contacts 144, 148 of the output terminal connector are connected, for example, to a conventional TV receiver. The resistor 146 provides a matching impedance of such a TV receiver when looking backwards into the transmission cable. Thus, the resistor 146 effectively terminates the television receiver in its characteristic impedance and prevents any reflections in the TV receiver from being inserted into the transmission cable itself.

Referring back to FIGURE 1, it will be seen that room 58 has a plug-in unit 56 of the B type, the equivalent circuitry of which is shown in FIGURE 3, to afford signal tap off to the television receiver 60. In addition to signal tap off, the B-type plug-in 60 also provides signal feed-through from the cable in room 58 to the cable in room 64.

Figure 4:
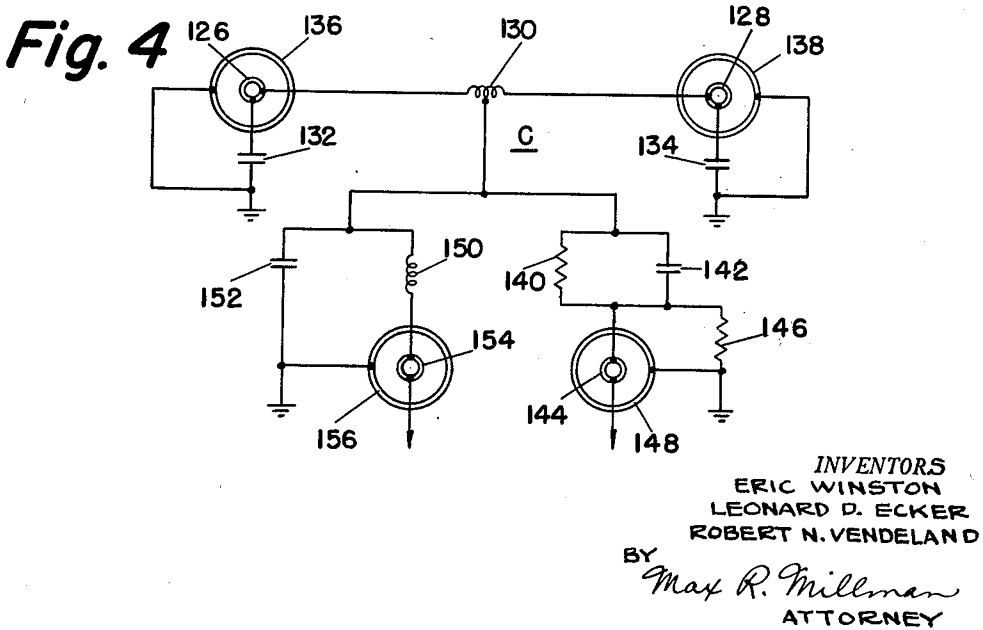

In FIGURE 4, the equivalent circuitry for a type C plug-in unit is shown which is similar to the type B plug-in unit. In addition, to the tap-off network, a low pass filter (formed of a series inductor 150 and shunt capacitor 152) is provided. This filter is connected between the feed-through inductor 130 and the contacts 154 and 156 of a second output terminal connector. The inductor 150 is designed to afford sufficient isolation and also can be used to tap off signals of low frequency.

Application of the type C plug-in unit is shown in room 64 of FIGURE 1. The control signals transmitted to the control circuits of camera 70 via the conductor 66 may be carrier-modulated control signals that are tapped off via the signal contact 154 of the type C plug-in shown in FIGURE 4. Such carrier control signals may be originated in the studio 20, for example, by an instructor operating the control console 24. The instructor can view the video monitor 22 receiving the video signals from the camera 70 and supply control signals to the control circuits 68 for that camera. Thereby, he can control such operations as tilt, focus, panning, and the like. The carrier frequency for the control signals, is, of course, outside the range of the video signals to ensure no interference. The video signals are inserted via network 150, 152 and contact 154 (FIGURE 4) indicated by the conductor 72 of FIGURE 1.

Figure 5:
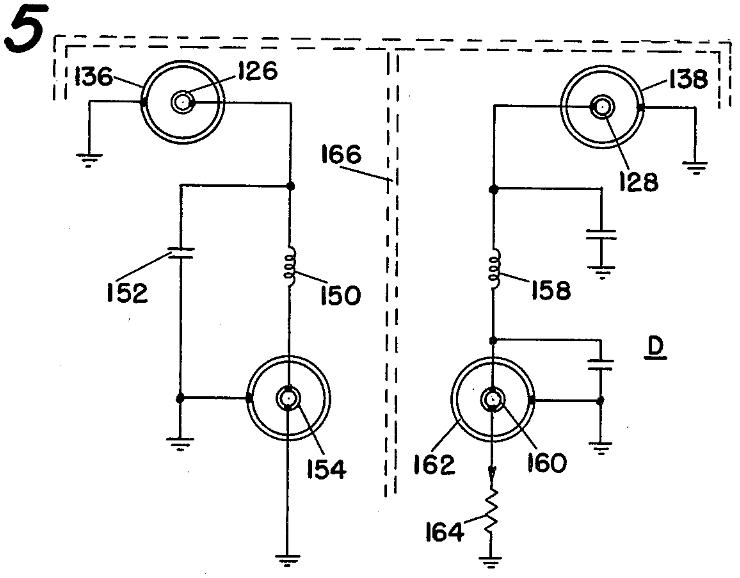

FIGURE 5 illustrates the equivalent circuitry for a type D plug-in unit. The type D circuit differs from the others described thus far in that there is no feed-through circuit connecting the signal contacts 126 and 128 of the plug-in unit. The contact 126 is connected through a low pass filter inductor-capacitor network 150, 152 to the output signal contact 154, which network is similar to the corresponding network of the type C plug-in unit. The other signal contact 128 is connected through an inductor-capacitor low-pass filter 158 to the signal contact 160 and shield contact 162 of a second output terminal connector. This second output signal contact 160 may provide low frequency tap off, such as video tap off. Also, alternatively, a matching resistor 164 may be connected to the signal contact 160 to terminate the cable in its characteristic impedance at that point. Between the two networks respectively connected to the terminals 126 and 128 is a physical barrier 166, such as a metal shielding plate, later to be described. This barrier is constructed to ensure video or radio frequency separation between the two circuits; for example, a separation of 90 db has been provided in practice.

An example of the function of the type D plug-in unit is illustrated in room 110 of FIGURE 1. Insertion into the cable via the contact 154 (FIGURE 5) is from a camera 112 to provide a closed circuit television program with the room 120 and others (not shown) in that direction. The contact 160 is terminated in the terminal impedance circuit 116 of the cable, thereby properly terminating the cable for the video coming from the preceding room 102. The barrier 166 in the plug-in unit 108 of room 110 affords substantially complete separation between the two video signals in the two portions of the plug-in unit. Thus, the video programs in adjacent rooms are conducted without interference, one with the other. Accordingly, the type D plug-in unit of FIGURE 5 affords a means for blocking signal transmission between different portions of the cable.

Figure 6:
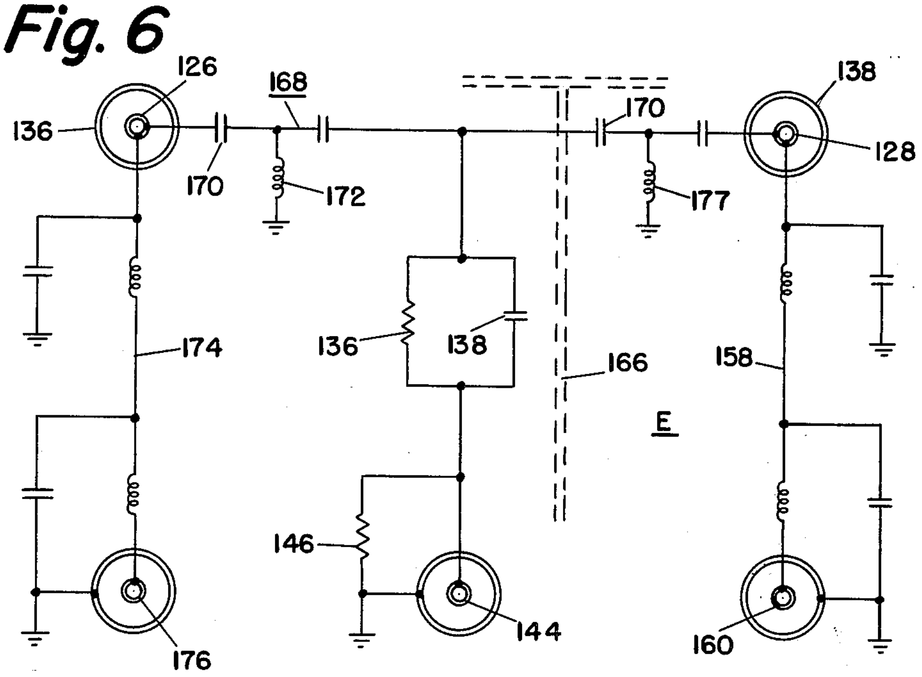
FIGURE 6 is an equivalent circuit diagram of another combined tap-off and insertion unit embodying this invention in which there is RF continuity at the VHF band and isolation in the video band.

In FIGURE 6, an equivalent circuit for the type E plug-in unit is shown, which is a variation of combinations of different networks previously described. A high pass filter 168, made up of series capacitors 170 and shunt inductors 172 is connected between the signal contacts 126 and 128 of that plug-in unit. Connected from the central portion of the filter 168 is a radio frequency tap-off unit, similar to that of FIGURE 3. A low-pass filter 158 similar to that of FIGURE 5 connects the contacts 128 and 160. A barrier 166 for radio frequencies separates the tap-off 136, 138 from the low-pass filter 158. A second low-pass filter 174 connects the signal contact 126 to the central contact 176 of a third terminal connector. The low-pass filters provide a symmetrical arrangement to receive signals coming from either direction. These filters are for passing the video signals and for blocking the radio-frequency signals that are passed by the high-pass filter 168. The high-pass filter blocks the relatively low frequency video signals.

The type E circuit is incorporated in the plug-in unit 34 in the studio room 20 of FIGURE 1, the lead 30 from the plug-in unit corresponding to the contact 160 (FIGURE 6), and the lead 32 corresponding to the contact 144 (FIGURE 6) for RF tap off. The length of cable 124 is terminated in its characteristic impedance.

The type E plug-in of FIGURE 6 may also be used simply for video tap off as shown in room 102 in which the output terminal connector 160 may be employed. A terminating impedance 106 connected to the RF tap off of the plug-in unit terminates the cable properly for RF signals. Also, the type E circuit may be used in order to isolate two video signals from different closed circuit programs. For example, in room 84 the plug-in unit 82 may be of the E type to tap off (through one low-pass filter 158) the video originating in room 64. The video signal from room 92 sees a termination of characteristic impedance 88 via the other low-pass filter 174 in plug-in unit 82.

The video signals from the camera 70 may be monitored in room 102, and that closed circuit program isolated from the program originating in room 92 by means of the high-pass filter 168 in the type E plug-in unit 82. However, the high frequency TV broadcast signals are transmitted through this filter 168 in the plug-in unit 82 to the TV receiver 94 in room 92. The type D plug-in unit 108 in room 110 terminates further transmission of the high frequency TV broadcast. This type D plug-in unit 108 also isolates the closed circuit program of that room 110 from the programs in the preceding rooms.

To summarize, the transmission line system of FIGURE 1 transmits TV broadcast to different rooms at the same time that a plurality of different closed circuit television programs are being put on. Simultaneously, camera-control signals may be transmitted along the line. The whole range of signals may be transmitted from one length of cable to the next using the plug-in types A, B, and C. At the same time the signals may be tapped off or inserted as the system requires. With the type E plug-in unit, the transmission of high frequency signals may be continued, and the low frequency signals tapped off and blocked from further transmission. With the type D unit, transmission of both high and low frequencies may be blocked, and tap-off, insertion, or termination provided.

It is manifest that the system is capable of modification and change to meet any desired programming needs because the only fixed part of the system is the sections of cable 26, and receptacles 28 installed in the wall and accessible through the outside of the wall at various locations. Since the receptacles hold the cable sections in such a manner that the ends of the cable are separated, feed-through units A are plugged into the receptacles to effect cable continuity while maintaining constant impedance in the line. Whenever it is desired to add a particular function, such as transmission, reception, control or combinations thereof, all that is required is the removal of the feed-through units at the desired locations and there replaced with plug-in units, such as units B to E, and the operative connection of such units to desired equipment.

It will be appreciated that the system of FIGURE 1 is intended to show various possible applications of the plug-in units in a variety of programs. The invention is not to be construed as limited only to the system and the five types of plug-in units shown and described.

Figures 9, 10, 11, 12:
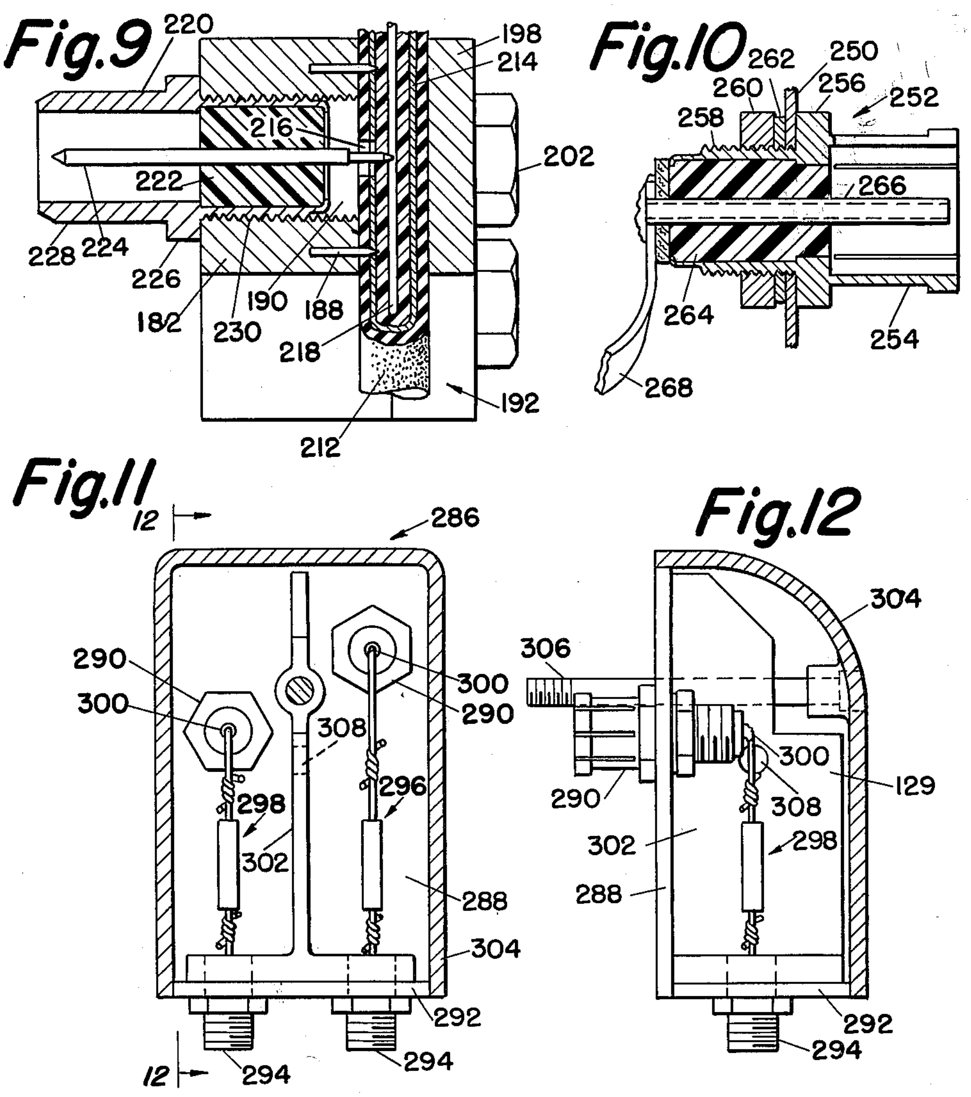
FIGURE 9 is an enlarged sectional view taken on the line 9—9 of FIGURE 7.
FIGURE 10 is an enlarged sectional view taken on the line 10—10 of FIGURE 7.
FIGURE 11 is an elevational view of one of several plug-in units embodying this invention.
FIGURE 12 is a sectional view taken on the line 12—12 of FIGURE 11.

Attention is now called to FIGURES 7–13 for a description of the components required to create the system whose versatility is shown in FIGURES 1–6. Indicated at 180 is a receptacle (referenced as 28 in FIGURE 1) comprised of a front member 182 whose rear face 184 is provided with spaced parallel semi-circular grooves 186 into which extend ground pins 188, the same being spaced about internally threaded through bores 190 whose axes are generally perpendicular to the longitudinal axes of the grooves 186. The broken ends of conventional coaxial cables 192 and 194 are placed in the respective grooves 186 and there clamped by back plates 196 and 198, each plate including a semi-circular groove 200 which cooperates with the groove 186 to form a through bore for the coaxial cable. Each plate is tightened and held in place by a headed bolt 202 whose shank extends through a smooth bore 204 and threaded bore 206 in the back plates and the front member 182, there being narrow grooves 208 in the front member and tongues 210 in the back plates 196, 198 which are received in said grooves to align the cooperating semi-circular cable-receiving grooves. When the back plates are properly tightened on the front member, the grounding pins 188 pierce the outer insulation 212 of the coaxial cable and make contact with the outer cable shield 214, as shown in FIGURE 9.

Using the receptacle 10 as a jig, an appropriate coring tool (not shown) is threaded into each of the bores 190 and rotated until a core of the outer insulation 212 and the outer cable shield 214 of the coaxial cable is removed as at 216, see FIGURE 9.

A pair of probe-type quick-disconnect male fittings 220 are provided, each being substantially cylindrical and including two internal insulating blocks 222 non-movably mounting an axially extending terminally pointed probe 224. The fitting includes an enlarged shoulder 226 intermediate its ends dividing the same into a front smooth portion 228 and a rear threaded portion 230. When the fitting is screwed home into each of the threaded bores 190, as shown in FIGURE 9, one pointed end of the probe 224 positively contacts the center signal conductor 218 of the coaxial cable, the concentric smooth front portion 228 being electrically connected to the coaxial shield 214 via the front member 182 and the grounding pins 188.

An inwardly dished bracket 232 is provided having flanges with keyhole slots 234 and a pair of tapped holes, there being screws 236 extending through said holes and threaded bores 238 in the receptable 180 by which the latter is mounted on the bracket. The bracket is in turn mounted upon a standard conduit box 240, the latter having headed screws which engage the keyhole slots 234 and holes to receive the cable. The inwardly dished portion of the bracket has a pair of holes 242 through which the male fittings 220 extend. A cover plate 244 is provided which is appropriately fastened at a desired location to the outer surface of a wall, the latter plate 244 also including spaced openings 246 which align with the male fittings 220.

Thus far, it will be understood that the above-described receptacle will be spaced throughout a building or facility at desired outlet locations, as described above with respect to FIGURE 1, but it should be remembered that the male fittings or posts 220 are tap offs from the separate coaxial cables which are not yet in electrical communication with each other. To effect such communication, a feed-through device 248 (plug-in A of FIGURE 1) is provided which by a simple plug-in method accomplishes this externally of the receptacle 180. The feed-through unit comprises a metallic base plate 250 mounting a pair of female quick-disconnect fittings 252. Each fitting is substantially cylindrical and includes a split sleeve portion 254 backed up by a nut-like shoulder 256. In front of the split sleeve is a threaded portion 258 which extends through the plate 250 and is mounted thereon by a nut 260 which urges the plate against the shoulder 256, there being a metallic washer 262 between the nut 260 and plate 250. Two plastic insulating members 264 are positioned inside the threaded portion 258 and non-movably mount an axially extending slotted tubular socket 266 having one end portion concentrically within the split sleeve 254. A compensating lead 268 (see also FIGURE 13) is soldered to the other end of the tube socket 266 of each female fitting 252.

In the coaxial connectors 220 and 252, the shield contacts are the tubular elements 228 and 254, respectively, and the signal contacts are the center elements 224 and 266, respectively.

An arcuate housing 270 is secured by appropriate drive pins to the plate 250 via the holes 272 in the plate and bosses (not shown) in the housing. When the split sleeve portions 254 of the female members 252 are pushed through the holes 246 of the plate 244, the spring action of the sleeve socket 254 and tubular socket 266 positively engage the outer smooth portions 228 and inner probe 224 of the male fittings 220, respectively, thereby establishing feed-through contact with the coaxial cables 192 and 194. To more positively secure the feed-through device in place, an elongated headed tamper-free bolt 274 is provided, the shank of which extends through apertures 276 in the housing 270, 278 in the plate 250, 280 in the face plate 244, 282 in the bracket 232, and finally engages in a tapped bore 284 in the receptacle 180.

At any outlet location to adapt the system for a desired tap off or insert, the feed-through device is removed by unscrewing the bolt 274 and pulling off the housing 270 and associated plate 250 mounting the female pressure-sleeve-type socket members 252. The feed-through device is then replaced by a member similar to it but one provided with circuitry to perform a desired function and one or more external fittings or connectors in addition to the female sockets to which a camera, receiver or other auxiliary equipment may be attached. A typical two connector line access plug utilizable for this purpose is shown in FIGURES 11 and 12. This structure corresponds to the D-type plug-in unit described above with respect to FIGURE 5.

The plug 286 comprises an L-shaped base plate 288 which mounts a pair of spaced female fittings 290 of split sleeve construction which is identical with that of the female fittings 252 previously described. The horizontal leg 292 of the L-shaped plate mounts a pair of threaded coaxial connectors 294, the inner or central conductors thereof being electrically connected by components 296 and 298 to the inner ends 300 of the inner split sleeve sockets of the respective female fittings 290. The components represented generally by elements 296 and 298 provide the circuitry of type D plug-in shown in FIGURE 5. A plate 302 integrally formed between the legs of base plate 288 and extending between the two connectors 290 is a barrier plate corresponding to the barrier 166 of FIGURE 5 described above. The outer split-sleeve sockets of the female fittings 290 communicate electrically with the outer or threaded members of the connectors 294 via the L-shaped plate 288. A housing 304 encases and is secured to the plate 288 and when the female members 290 of the tap-off unit are pushed through the holes 246 of the face plate 244 and positively engage the male members 220 of the receptacle, the connectors 294 are in communication with the coaxial cables 192 and 194 and ready for attachment, with ease of manipulation, to a receiver, camera or other auxiliary equipment. As in the case of the feed-through unit, an elongated headed bolt 306 is provided which extends through the housing, barrier plate and base plate.

Figure 7:
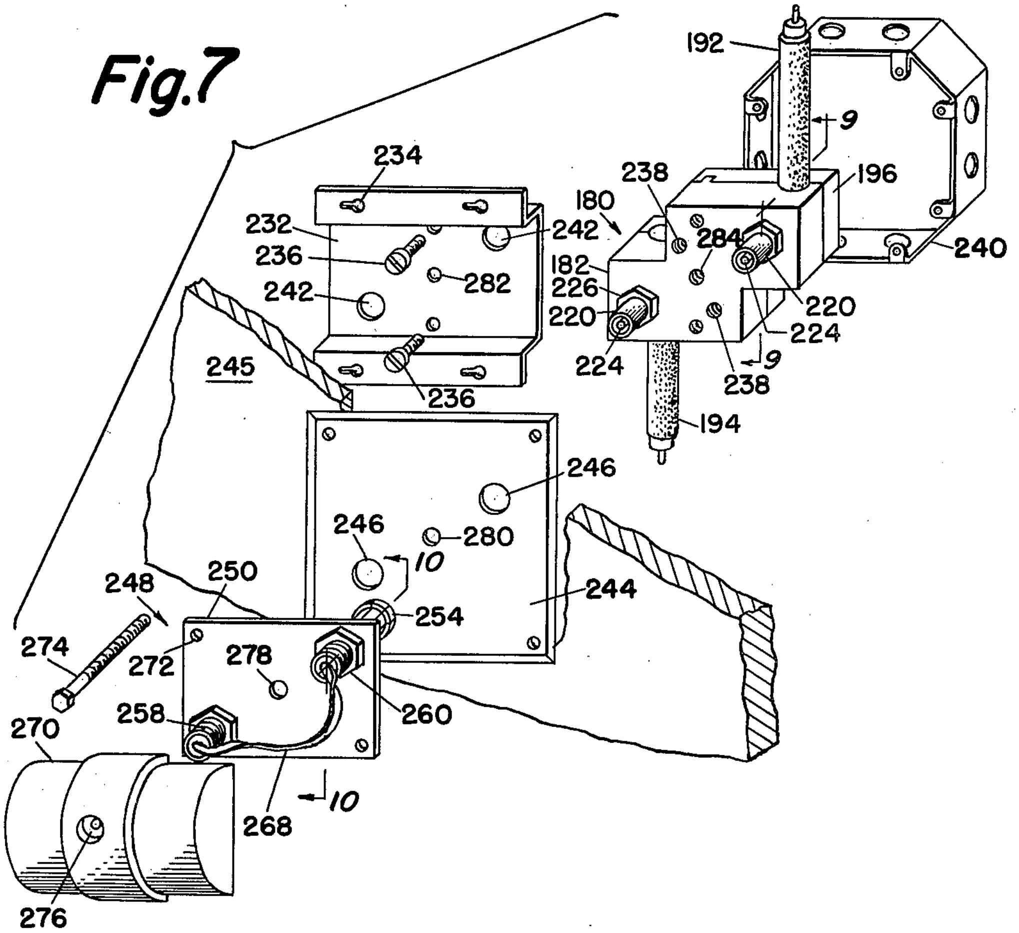
FIGURE 7 is a group perspective view of a cable receptacle and feed-through plug-in unit.
Figure 8:
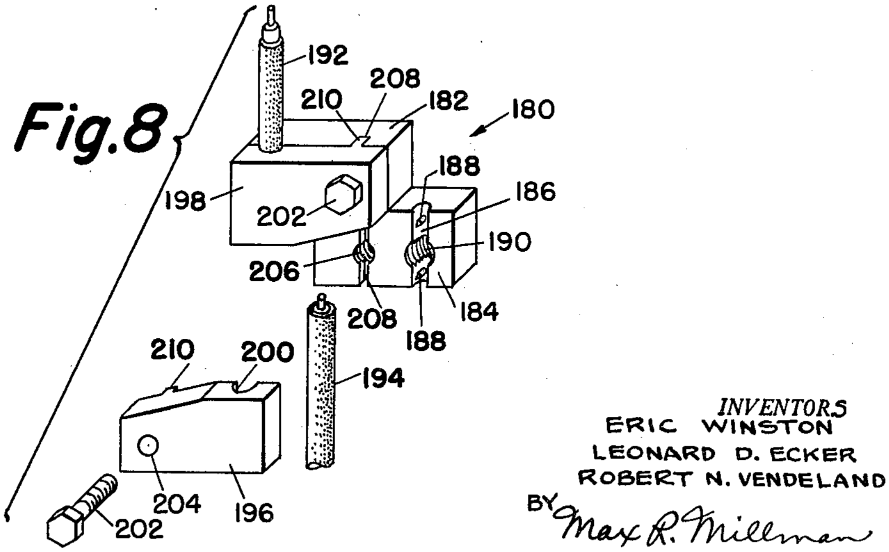
FIGURE 8 is a group perspective view of the cable receptacle per se looking at the rear thereof.
Figure 13:
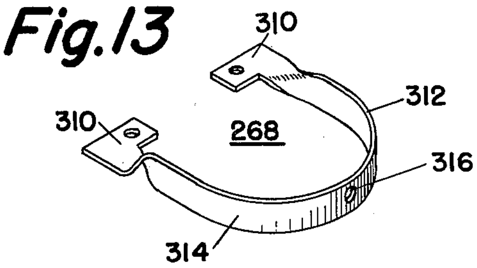
FIGURE 13 is an enlarged face view of a portion of the compensating feed-through lead used in certain of the plug-in units.

The plug-in units of the types B and C are constructed in a fashion similar to that shown in FIGURES 11 and 12. To provide the compensation circuit 130, 132, 134 (FIGURES 3 and 4) of the B and C plug-in types, a lead such as the lead 268 in FIGURES 7 and 13 is used. This compensating lead may be mounted on a base plate such as the plate 288 shown in FIGURE 11. A hole 308 in the barrier plate 302 would afford suitable passage for such a lead. For the B and C plug-in types, the components are connected to the center of the compensating lead 268 instead of to the inner contacts 300.

The construction of the type E plug-in of FIGURE 6 differs from that of FIGURE 11 only in that components for one circuit are mounted on one side of the barrier plate 302 and components for the two others on the other side, with one of those two circuits connected to the center of a filter circuit, which filter is connected between the inner contacts 300 through the hole 308. A third coaxial connector, in addition to the two connectors 294 is provided, so that there is a connector for each of the three circuits in the type E plug-in unit.

In FIGURE 13, the conductive strip 268 used as the compensating lead in the feed-through circuits of type A, B and C plug-ins is shown in further detail. This strip is relatively thin and is made of a good conductor, for example, copper or spring brass strip, preferably silver plated. The inductance afforded by this strip is directly proportional to its length and inversely proportional to its cross-section. The capacitance provided by the strip is the capacitance between the strip and the flat base plate (plate 250 in FIGURE 7, plate 288 in FIGURE 11) of the plug-in unit. The terminal portions 310 of the strip are attached to the central signal contacts 266 of FIGURE 10 (or central contacts 300 of FIGURE 11) and form this capacitive portion of the feed-through circuit. The capacitance is proportional to the area that the terminal portion 310 of the strip 268 presents to the base plate (plate 250 of FIGURE 7, plate 288 of FIGURE 11) and also proportional to the distance between the strip 268 and that base plate. The central portion of the strip 268 is twisted to present the smaller area of the thin face 312 of the strip to the base plate of the receptacle (and to set at right angles thereto the larger area of the wide face 314), thereby to minimize the capacitance between the central portion of the strip and the receptacle plate. This twist insures that the capacitance is kept to a negligible amount along the central portion of the strip and effectively restricted to the terminal portions of that strip. A hole 316 through the wide face 144 permits attachment of electrical components for the type B and C plug-in units.

Thus it will be seen that the receptacles, feed-through and other plug-in units are of such construction as to permit modification and variation of a coaxial closed circuit system effectively and expeditiously.

While a preferred embodiment of the invention has been shown and described herein, it is understood that skilled artisans may make minor variations without departing from the spirit of the invention and the scope of the appended claims.

We claim:

1. A closed circuit television system comprising a multiplicity of lengths of coaxial cable, a plurality of receptacles attached to said lengths of cable with each of said receptacles being attached to the ends of two cable lengths to form a transmission line, a plurality of jacks arranged for electrical connection to said receptacles, each of said receptacles including a plurality of first coaxial contacts connected to the ends of the respective lengths of cable, each of said jacks including a plurality of second coaxial contacts adapted to be connected to and disconnected from said first contacts, and an electrical circuit, said jacks being of at least two types, said electrical circuit of each of a first type of said jacks including means connected between said second contacts for providing a cable continuation over substantially the entire range of frequencies that may be transmitted by said cable, each of said circuits of certain ones of said first type of jacks including means for tapping off or inserting signals, said circuit of a second type of said jacks including means for blocking signal transmission between said second contacts at least over a limited range of certain video frequencies, separate means for supplying different video signals to a plurality of said first jacks, and means connected to a plurality of said first jacks for displaying certain signals received thereat, at least one of said second jacks being connected to the cable receptacles between said separate video supplying means so as to prevent interference between the different video signals in different portions of said cable.

2. A transmission line system comprising a multiplicity of lengths of coaxial cable, a plurality of receptacles attached to said lengths of cable to form a transmission line with each of said receptacles being attached to the ends of two different cables, and a plurality of jacks arranged for connection to said receptacles, each of said receptacles including a plurality of first coaxial contacts connected to the ends of the respective lengths of cable, each of said jacks including a plurality of second coaxial contacts adapted to be connected to and disconnected from said first contacts, and an electrical circuit, said jacks being of five types, said electrical circuit of each of first, second, third, and fourth types of said jacks including means connected between said second contacts for providing a cable continuation over a substantial range of frequencies, said cable continuation means of said first, second, and third jacks providing cable continuation over substantially the entire range of frequencies to be transmitted by said cable, said circuit of said first jack including means for tapping off a certain percentage of the signal in said cable over a substantial portion of said range of frequencies, said circuit of said second jack including means for tapping off and inserting signals over a substantial portion of said range of frequencies, said cable continuation means of said fourth jack providing cable continuation over a limited range of high frequencies, said circuit of said fourth jack including a network shunting said cable continuation means and passing signals of a limited range of low frequencies, said electrical circuit of a fifth type of said jacks including separate networks connected to said second contacts one of which separate networks is adapted to pass a substantial portion of said range of frequencies, said fifth jack further including a high frequency barrier between said separate networks.

References Cited in the file of this patent

UNITED STATES PATENTS

| | | |
|---|---|---|
| 1,733,609 | Kuhn | Oct. 29, 1929 |
| 1,835,031 | Espenschied | Dec. 8, 1931 |
| 2,523,173 | Winters | Sept. 19, 1950 |
| 2,615,948 | Kamen | Oct. 28, 1952 |
| 2,815,440 | Fletcher | Dec. 3, 1957 |
| 2,878,458 | Jackson | Mar. 17, 1959 |
| 2,930,024 | Harbourt | Mar. 22, 1960 |
| 2,938,075 | Gargini | May 24, 1960 |

OTHER REFERENCES

Publication: "Radio Frequency Distribution Systems," Western Electric Co. (copyright 1932, Western Electric Co., Inc. (pp. 15 to 20).